Oct. 4, 1966  J. W. SMITH  3,276,493
RING INLAY TOOL AND METHOD OF MAKING A RING INLAY
Filed Oct. 8, 1965

INVENTOR
JAMES W. SMITH
BY Brewster and Witherspoon
ATTORNEYS

United States Patent Office 3,276,493
Patented Oct. 4, 1966

3,276,493
RING INLAY TOOL AND METHOD OF MAKING
A RING INLAY
James W. Smith, 921 N. Acacia Ave., Whittier, Calif.
Filed Oct. 8, 1965, Ser. No. 494,193
5 Claims. (Cl. 144—314)

This invention relates to woodworking tools and more particularly to an adjustable ring inlay tool for cutting both the groove in the member to be inlaid and the inlay ring and the method for making a ring inlay.

In making ring type inlays, great difficulty is experienced in obtaining a perfect fit between the inlay groove and the inlay ring which is placed therein. Since this type of work is done mostly for artistic presentations rather than the utilitarian aspects of the inlaid member, a very neat and smooth fitting inlay is necessary. It is with this in mind that this tool of this invention and method have been devised.

In view of the foregoing it is an object of this invention to provide a ring inlay tool which may be used to form both the groove in the member to be inlaid and the inlay ring without moving the tool other than longitudinally adjusting the respective cutting bits.

It is another object of this invention to provide a tool as set forth above which is simple in construction and virtually foolproof in operation.

It is still a further object to provide a method of making a ring type inlay which is efficient, accurate and easy to perform.

The foregoing and other objects will become apparent when taken in conjunction with the following detailed description and drawing showing by way of example one preferred embodiment of this invention and wherein.

Figure 1:
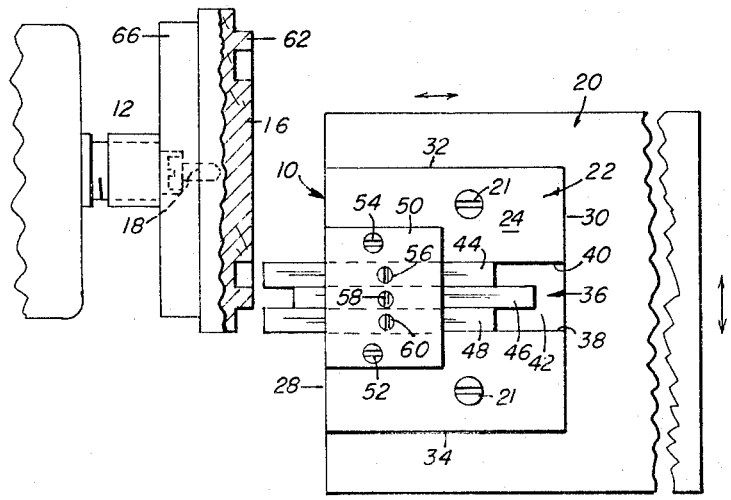
FIG. 1 is a top plan view of the ring inlay tool as it is used in conjunction with a rotatable chuck mounting a workpiece from which the inlay ring is to be cut and a tool holder on which the tool is mounted for longitudinal and lateral movement with respect to the chuck.

The ring inlay tool 10 of this invention is adapted for use in conjunction with woodworking apparatus including a rotatable chuck 12 adapted to mount a workpiece 16 by means of a screw 18 or other suitable means. A toolholder 20 is mounted such that it has both longitudinal and lateral movement with respect to the chuck 12.

Figure 2:
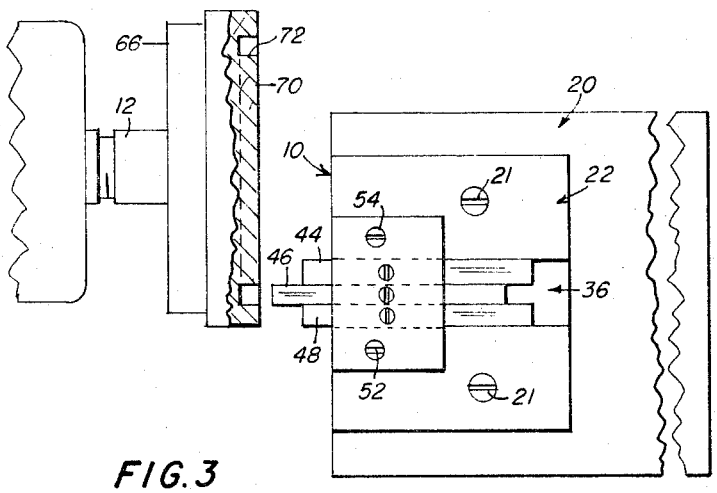
FIG. 2 is a top plan view similar to FIG. 1 except that in this view the inlay tool is shown cutting the groove in the workpiece to be inlaid.
Figures 3, 4:
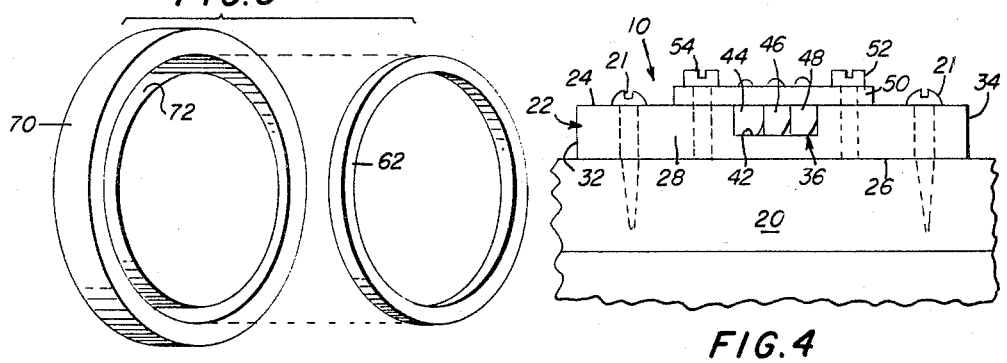
FIG. 3 is a perspective-exploded view of the inlay ring and the grooved member to be inlaid.
FIG. 4 is an elevational view showing the manner in which the tool is secured to the tool holder and details of the tool itself.
Figure 5:
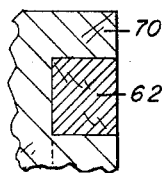
FIG. 5 is a cross-sectional view showing the manner in which the inlay ring fits in the grooved member.

As illustrated in FIGS. 1, 2 and 4, the ring inlay tool 10 of this invention comprises a rectangular base 22 having a top 24, bottom 26, side surfaces 28 and 30 and end surfaces 32 and 34. The base has a recess 36 of U-shaped cross section formed between and parallel to end surfaces 32 and 34 with the open end of the U in the top of the base. The recess extends completely through the base widthwise as shown in FIGS. 1 and 2, but has a depth less than the thickness of the base 22. More particularly, the longitudinal side walls 38 and 40 of the recess 36 are parallel to each other and perpendicular to the recess bottom 42.

Three similarly shaped cutting bits 44, 46 and 48 are slidably positioned in recess 36. These cutting bits are generally rectangular in cross section having parallel side walls and a top and bottom perpendicular thereto. The width of the recess 36 is such that the cutting bits 44, 46 and 48 fit snugly therebetween. In order to close off a portion of the upper face of the recess 36, a cover plate 50 is positioned thereover and secured to the base 22 by means of screws 52 and 54. Set screws 56, 58 and 60 are threadedly mounted in the cover plate 50 to individually and independently secure cutting bits 44, 46 and 48, respectively, in fixed position in the recess 36. The base 22 is secured to the tool holder 20 by means of screws 21.

Referring particularly to FIG. 1, there is illustrated the arrangement for producing the inlay ring 62 shown in FIG. 3. In making the ring 62 workpiece 16 of suitable material is secured to the face plate 66 by screw 18. After this, the cutting bits 44 and 48 are extended outwardly to a distance slightly exceeding the desired thickness of the ring with respect to the end of the center cutting bit 46 and secured in such position. The tool holder 20 is then laterally adjusted to the correct radial position with respect to the workpiece 16 whereupon the chuck is rotated and the tool holder is fed into the workpiece to bring about the cutting action. After the ring is cut to the prescribed thickness, the workpiece is removed from the bench and the ring portion severed from the workpiece by any well known means such as chiseling or sawing.

In order to form the groove in the workpiece to be inlaid a member 70 of suitable material is chucked up in the same manner as before and with the tool holder 20 in the same lateral position as in the forming of the ring 62, the cutting bits 44 and 48 are retracted and the bit 46 extended outwardly a sufficient distance to cut a groove 72 of the necessary depth to receive ring 62. As before, with the tool so positioned, the cutting bit is fed into the workpiece 70 and the groove 72 formed therein. After this is completed the workpiece 70 is removed from the chuck and the inlay ring 62 assembled in the groove 72 in the conventional manner.

The fact that the tool holder is not moved laterally in performing the two cuts coupled with the relationship of the three cutting bits makes possible an almost foolproof inlay cutting operation. As previously noted, the parallel side walls 38 and 40 of the recess 36 cooperating with the closely fitting parallel side walls of the cutting bits 44, 46 and 48 makes it possible to control the distance from the chuck center to the two cuts with great accuracy. Obviously, the widths of the cutting bits may be varied and if for some reason the recess width is too wide spacers may be employed to assure the close fit and parallel movement necessary to accomplish the desired results.

In view of the foregoing, it will now appear clearly that there has been developed a ring inlay tool which is virtually foolproof in use and a method for making a ring inlay which is within the capabilities of unskilled persons. The types of material from which the various elements of the tool may be made is a matter of choice depending on the particular use involved.

I claim:
1. A ring inlay tool for use in conjunction with woodworking apparatus including a rotating chuck for securing a workpiece thereto and a tool holder adjustable longitudinally and laterally with respect to the chuck, said tool comprising a base having a recess therein, three cutting bits positioned in said recess for parallel sliding movement therein relative to each other, and means for securing each cutting bit in position in the recess independently of the other whereby with the workpiece to be inlaid secured to the chuck and the tool secured to the tool holder and positioned at the desired radial distance from the chuck center, the center cutting bit is extended out beyond the other two cutting bits and secured in such position to be fed into the rotating workpiece to form the inlay groove and whereby with the tool in the same fixed position the center bit is retracted and the two outer cutting bits extended and fed into the workpiece to cut a ring of the same radial size as the inlay groove in a member which is secured to the chuck after removal of the grooved member to be inlaid thereby assuring perfect matching of the inlay ring and the inlay groove.

2. A ring inlay tool for use in conjunction with woodworking apparatus including a rotating chuck for securing a workpiece thereto and a tool holder adjustable longitudinally and laterally with respect to the chuck, said tool comprising a rectangular base having a bottom, top, side and end surfaces, said base having a recess of U-shaped cross section formed therein and extending completely across the base parallel to the end surfaces thereof, said recess having a depth less than the thickness of the base and having the open end of the U-shaped recess in the base top, the longitudinal side walls of the recess being parallel to each other and perpendicular to the recess bottom surface, three cutting bits positioned in said recess for sliding movement with respect to each other and the recess surfaces and parallel to the side walls of the recess, a cover plate extending across the recess and secured to the base covering the cutting bits within the recess, and means on the cover plate for individually and independently securing each cutting bit in position in the recess whereby with the workpiece to be inlaid secured to the chuck and the tool secured to the tool holder and positioned at the desired radial distance from the chuck center, the center cutting bit is extended out beyond the other two cutting bits and secured in such position to be fed into the rotating workpiece to form the inlay groove and whereby with the tool in the same fixed position the center bit is retracted and the two outer cutting bits extended and fed into the workpiece to cut a ring of the same radial size as the inlay groove in a member which is secured to the chuck after removal of the grooved member to be inlaid thereby assuring perfect matching of the inlay ring and the inlay groove.

3. The invention as set forth in claim 2 wherein the means on the cover plate for individually and independently securing each cutting bit in position comprises a set screw threadedly mounted in the cover plate in alignment with each cutting bit so that each set screw may be screwed down into engagement with its respective cutting bit.

4. The invention as set forth in claim 2 and wherein the cutting bits are of rectangular cross section so that their surfaces respectively engage each other and the side walls and bottom of the recess, whereby the bits will smoothly and evenly fit and slide with respect to each other.

5. A method of making a ring type inlay comprising the steps of:
   (1) Securing a workpiece from which the ring inlay is to be cut to a rotatable chuck,
   (2) Affixing a ring inlay tool having three cutting bits adapted for parallel movement toward and away from the chuck to a tool support having both lateral and longitudinal movement with respect to the chuck,
   (3) Extending the two outer cutting bits beyond the center cutting bit to a depth slightly greater than the desired thickness of the inlay ring,
   (4) Feeding the total support toward the rotating workpiece to cut out the ring inlay,
   (5) Retracting the tool support and removing the workpiece from the chuck,
   (6) Removing the cut ring-like portion from the workpiece,
   (7) Securing a workpiece which is to receive the inlay to the rotatable chuck,
   (8) With the ring inlay tool in the same position as originally set adjusting the three cutting bits so that the center bit extends out beyond the other two a distance equal to the depth of the desired inlay groove,
   (9) Feeding the tool support inward to cut the groove in the workpiece and then retract the tool support,
   (10) Removing the workpiece from the chuck, and
   (11) Assembling the inlay ring in the inlay groove in the workpiece.

No references cited.

WILLIAM W. DYER, JR., *Primary Examiner.*

R. J. ZLOTNIK, *Assistant Examiner.*